United States Patent
Lin et al.

(10) Patent No.: US 7,271,851 B2
(45) Date of Patent: Sep. 18, 2007

(54) ADAPTIVE COLOR TRANSIENT IMPROVEMENT

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 538 days.

(21) Appl. No.: 10/345,552

(22) Filed: Jan. 16, 2003

(65) Prior Publication Data

US 2003/0107678 A1    Jun. 12, 2003

(51) Int. Cl.
H04N 5/00   (2006.01)
H04N 5/21   (2006.01)
H04N 9/68   (2006.01)
G06K 9/40   (2006.01)

(52) U.S. Cl. ........... 348/631; 348/606; 348/610; 348/612; 348/621; 348/624; 348/627; 348/630; 348/645; 382/261; 382/266

(58) Field of Classification Search ........ 348/631, 348/606, 610, 612, 621, 624, 625, 627, 630, 348/645, 673, 683; 382/260, 261, 263, 266; H04N 5/21
See application file for complete search history.

(56) References Cited

U.S. PATENT DOCUMENTS

| | | | | |
|---|---|---|---|---|
| 4,935,806 A * | 6/1990 | Rabii | ............ | 348/606 |
| 5,196,736 A * | 3/1993 | Doornhein et al. | ........ | 327/170 |
| 5,225,910 A * | 7/1993 | Sugimori et al. | ............ | 348/613 |
| 5,369,446 A * | 11/1994 | Parker et al. | ............... | 348/625 |
| 5,920,357 A | 7/1999 | Ohara | | |
| 5,930,402 A * | 7/1999 | Kim | ............ | 382/274 |
| 5,936,682 A * | 8/1999 | Thomas et al. | ............ | 348/625 |
| 6,094,205 A * | 7/2000 | Jaspers | ............ | 348/625 |
| 6,571,224 B1 * | 5/2003 | He et al. | ............ | 706/8 |
| 6,600,517 B1 * | 7/2003 | He et al. | ............ | 348/625 |
| 6,611,296 B1 * | 8/2003 | Nieuwenhuizen et al. | .. | 348/625 |
| 6,657,677 B1 * | 12/2003 | He et al. | ............ | 348/625 |
| 6,690,429 B1 * | 2/2004 | Kim | ............ | 348/625 |
| 6,717,622 B2 * | 4/2004 | Lan | ............ | 348/625 |
| 6,795,083 B2 * | 9/2004 | Bao et al. | ............ | 345/589 |
| 2002/0067862 A1 * | 6/2002 | Kim | ............ | 382/266 |
| 2002/0140865 A1 * | 10/2002 | Matsushita et al. | ......... | 348/631 |
| 2003/0206245 A1 * | 11/2003 | Lin et al. | ............ | 348/631 |

FOREIGN PATENT DOCUMENTS

CN     1045209     9/1990

* cited by examiner

Primary Examiner—Brian P. Yenke
(74) Attorney, Agent, or Firm—Kenneth L. Sherman; Michael Zarrabian; Myers Dawes Andras & Sherman, LLP

(57) ABSTRACT

A superior Color Transient Improvement technique is adaptive to the local image features, so that more natural color edge transition improvement can be accomplished. A gain control function is provided that depends on the local image feature so that different regions of the image can be treated differently. Further, a correction signal is controlled in such a way (by the local image feature) that neither undershoot nor overshoot occurs, eliminating the need for post-processing for undershoot/overshoot removal.

26 Claims, 4 Drawing Sheets

ADAPTIVE COLOR TRANSIENT IMPROVEMENT

FIELD OF THE INVENTION

The present invention relates generally to image signal processing, and more particularly to enhancing sharpness of color transitions in color TV broadcasting.

BACKGROUND OF THE INVENTION

In color TV broadcasting standards, such as NTSC, PAL and SECAM, the transmitted signals include chrominance signals and luminance signals. In comparison to the luminance signal bandwidth, the chrominance signal bandwidth is rather narrow. The limited bandwidth of the chrominance signal produces relatively slow chrominance transitions, causing smeared color edges in the received/displayed images.

Different techniques have been used in attempts to enhance the sharpness of color transitions, such as those described in U.S. Pat. No. 4,935,806 and U.S. Pat. No. 5,920,357, known as "Color Transient Improvement" techniques. The basic steps in the Color Transient Improvement techniques are to add a "correction signal" (using a high-pass filter) to the original chrominance signals to restore the frequency components lost due to the limited bandwidth. This is followed by a post-processing to remove any undershoot and overshoot.

Typically, the "correction signal" is multiplied by a control parameter to control the overall gain. Existing techniques use a constant control parameter for an entire image, regardless of the variance in different regions of the image. However, this leads to unnatural appearance in some color edge areas of the image. As such, there has been a need to treat different regions of the image differently, and to also control the correction signal so that neither undershoot nor overshoot occurs, whereby post-processing for undershoot/overshoot removal is eliminated.

BRIEF SUMMARY OF THE INVENTION

The present invention addresses the above problems. An object of the present invention is to provide a superior Color Transient Improvement (CTI) technique which is adaptive to the local image features, so that more natural color edge transition improvement can be accomplished. In one embodiment, the present invention provides a gain control function that depends on the local image features so that different regions of the image can be treated differently. Further, a correction signal is controlled in such a way (using the local image features) that neither undershoot nor overshoot occurs, eliminating the need for post-processing for undershoot/overshoot removal.

An example CTI technique according to the present invention includes the steps of, first determining the second derivative of a smoothed version of the input chrominance signal. Then, a gain control function is constructed as a function of the second derivative. Unlike the conventional approaches, wherein a constant parameter is used for the entire image to control the enhancement gain, the present invention uses a control function which provides different gains for different image areas. In one version, the gain control function can range between 0 and 1, and varies with the local image feature that is characterized by the second derivative. Together with the sign of the second derivative, the gain control function determines how to correct slow color transitions.

A positive second derivative corresponds to a point on the color transient curve where the curve is "concave up". At that point, there is a "push" of the transient curve towards its local minimum. A negative second derivative corresponds to a point on the color transient curve where the curve is "concave down". At that point, there is a "push" of the transient curve towards its local maximum. The result of this procedure is a sharpened transient curve. The "push" is controlled by the gain control function and the local minimum and local maximum. Because the furthest a point on the transient curve can be pushed to, is the local minimum or local maximum, essentially no undershoot or overshoot occurs.

The aforementioned "push" mechanics is realized by adding a "correction signal" to the original signal. In conventional techniques, the added "correction signal" is a high frequency signal obtained by various high-pass filters. This approach usually causes undershoot or overshoot. According to the present invention, however, the "correction signal" is the distance between the original signal and its local minimum or maximum. This essentially guarantees that there is no undershoot nor overshoot, and the need for post-processing to remove undershoot/overshoot is eliminated.

The present invention further prevents noise accentuation. In the noisy image areas where there is no significant color transition, the second derivatives of the smoothed chrominance signals are very close to zero. Therefore, the gain control function, which is a function of the second derivative, is very close to zero in such areas. As such, the signals are barely changed in these areas, wherein the existing noise is not accentuated.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Overview

With reference to the drawings, an embodiment of a superior Color Transient Improvement (CTI) technique according to the present invention is described. Such a CTI technique is adaptive to the local image feature, so that more natural color edge transition improvement can be accomplished. In one example, a gain control function is provided which depends on the local image feature so that different regions of the image can be treated differently. Further, a correction signal is controlled in such a way (by the local image feature) that neither undershoot nor overshoot occurs, eliminating the need for post-processing for undershoot/overshoot removal.

An example CTI technique according to the present invention includes the steps of, first determining the second derivative of a smoothed version of the input chrominance signal. Then, a gain control function is constructed as a function of the second derivative. Unlike the conventional approaches, the present invention uses a control function which provides different gains for different image areas.

In one example, the gain control function can range between 0 and 1, and varies with the local image feature that is characterized by the second derivative. Together with the sign of the second derivative, the gain control function determines how to correct slow color transitions.

A positive second derivative corresponds to a point on the color transient curve where the curve is "concave up". At that point, there is a "push" of the transient curve towards its local minimum. A negative second derivative corresponds to a point on the color transient curve where the curve is "concave down". At that point, there is a "push" of the transient curve towards its local maximum. The result of this procedure is a sharpened transient curve. The "push" is controlled by the gain control function and the local minimum and local maximum. Because the furthest a point on the transient curve can be pushed to, is the local minimum or local maximum, essentially no undershoot or overshoot occurs.

The aforementioned "push" mechanics is realized by adding a "correction signal" to the original signal. In conventional techniques, the added "correction signal" is a high frequency signal obtained by various high-pass filters. This approach usually causes undershoot or overshoot. According to the present invention, however, the "correction signal" is based on the distance between the original signal and its local minimum or maximum. This essentially guarantees that there is no undershoot nor overshoot, and the need for post-processing to remove undershoot/overshoot is eliminated.

Example Implementation

Figure 1:
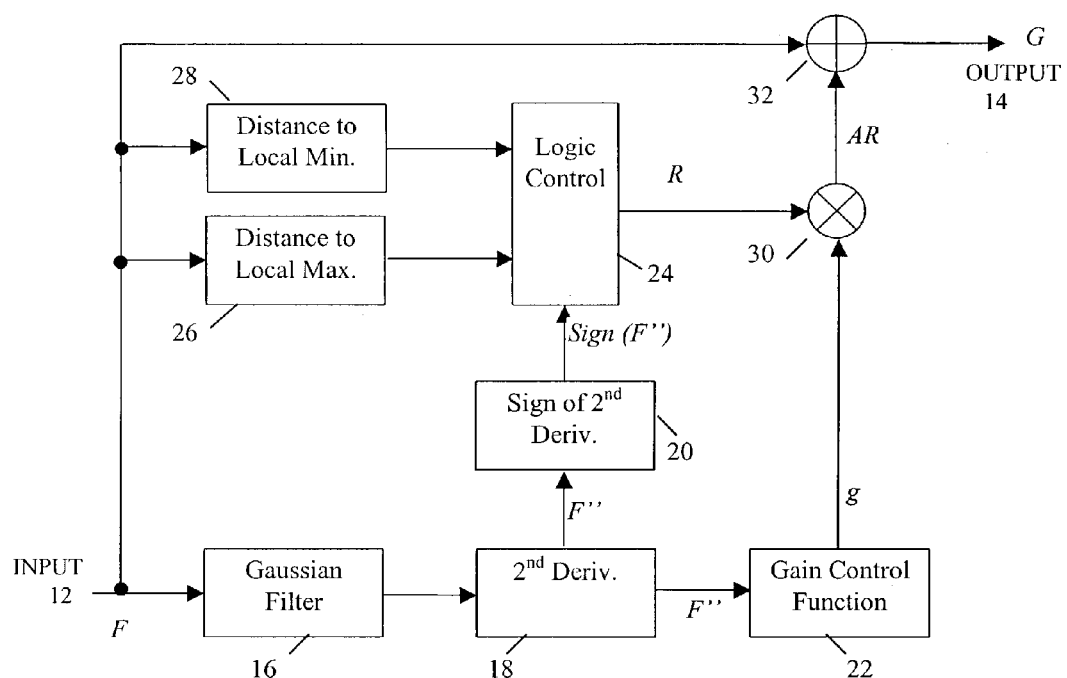
FIG. 1 shows an example block diagram of an embodiment of a Color Transient Improvement logic according to the present invention.

An example logic arrangement or system 10, embodying aspects of the present invention, is shown in the block diagram of FIG. 1. An input to the system 10 is the chrominance signal 12 (U or V), and an output is the corresponding enhanced chrominance signal 14 with steep color edges. For simplicity of description herein, the input chrominance signal 12 is denoted as F, which refers to either U or V, and the corresponding output chrominance signal 14 is denoted as G. The input chrominance signal F is assumed to be a digital signal. If the incoming signals are analog waveforms, they are first converted into sampled digital signals (e.g., using a analog-to-digital converter/sampler, not shown).

The input signal F is supplied to a low-pass filter 16, such as a "Gaussian filter". Although other types of low-pass filters can be used, a "Gaussian filter" is preferred due to its superior smoothness properties. A 7-tap filter as an approximation of the "Gaussian filter" with standard deviation 1 is used as the low-pass filter 16 to smooth the input signal F. The output of the "Gaussian filter" is supplied to a second derivative calculator ("$2^{nd}$ Deriv.") 18 to determine the second derivative F".

Because the second derivative F" is calculated from a smoothed version of the input signal F, the second derivative F" is less sensitive to the noise. Further, the second derivative F" is a more accurate reflection of the geometric properties (i.e., concave up or concave down) of the transition curve of the input signal F. Instead of the second derivative, other measures (e.g., other derivatives and/or combinations thereof) indicating geometric properties of the signal, can also be used. The second derivative F" is preferably approximated in the second derivative calculator 18 by a band-pass filter with the filter coefficients (1, 0,-2, 0, 1).

The output F" of the second derivative calculator 18, is supplied to both a "sign of second derivative" unit 20 and a "gain control function" unit 22. The "sign of second derivative" unit 20 produces the sign of the second derivative F", denoted as sign(F"). As such:

If $F''>0$, then sign($F''$)=1;

If $F''<0$, then sign($F''$)=-1;

If $F''=0$, then sign($F''$)=0.

Although in the example herein the sign of the second derivative is used, in other embodiments, a comparison of the value of the second derivative to one or more threshold values can be used.

The sign of the second derivative is supplied to a "logic control unit" 24, which essentially determines whether the transition curve will be "pushed" upward or downward, as described in more detail further below.

The "gain control function" unit 22 first computes the absolute value of the second derivative, |F"|, and then constructs a gain control function g. The basic requirements of the gain control function g are that: (i) It is a continuous (or smooth) increasing function ranging between 0 and 1, (ii) It is close to 0 for small absolute value of the second derivative F" and is close to 1 for larger absolute value of the second derivative |F"|. An example gain control function can be represented as:

$$g = \frac{|F''|}{C+|F''|}$$

wherein F" is the second derivative calculated from the smoothed version of the input signal F, and C>0 is a fixed constant. C determines the strength of the function g. An example range for C is between about 0 and 3.

Figure 2:
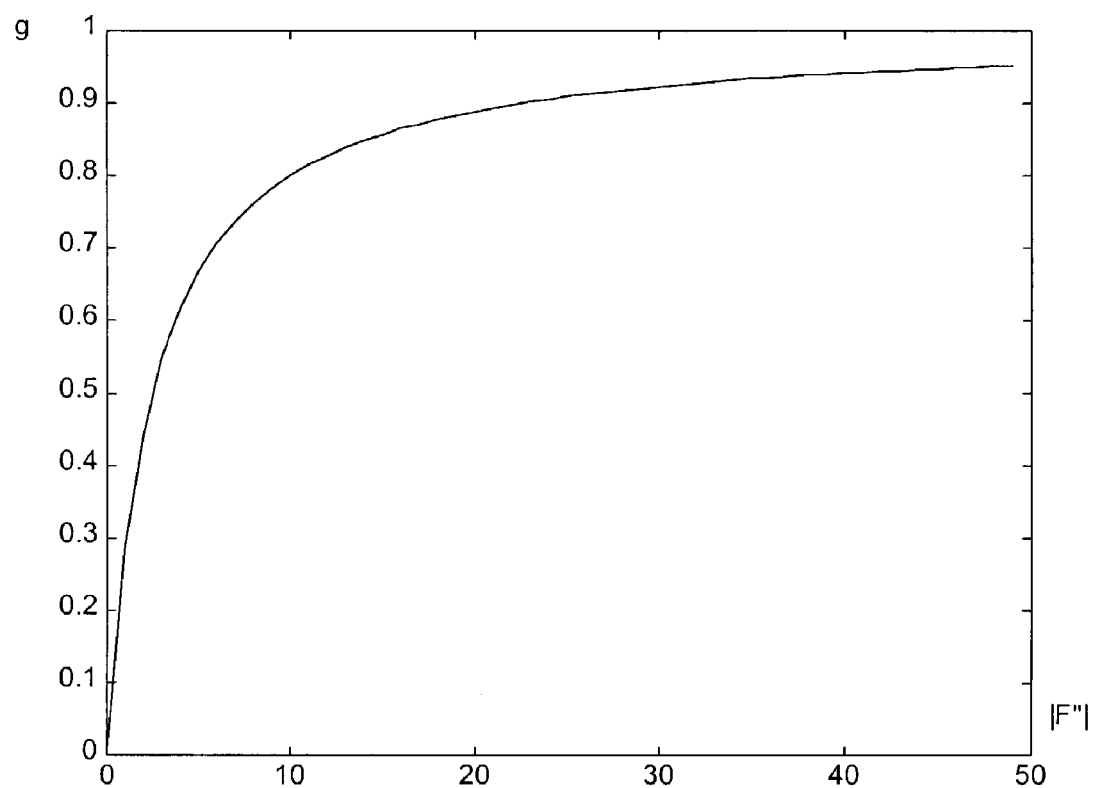
FIG. 2 is an example plot of a gain control function for the logic in FIG. 1.

FIG. 2 shows an example plot of the above gain control function g with C=2.5, wherein the dimensions on the horizontal axis in FIG. 2 is same as |F"|. The gain control function g provides different gains for different image areas, making the color transient enhancement processing adaptive to local image feature, according to the present invention. In a flat area or featureless noise area, because the second derivative of the smoothed image, F", equals to or approximately equals to zero, the gain control function g essentially provides no gain. In an area where color transition occurs, the absolute value of the second derivative of the smoothed image, |F"|, is larger, wherein the gain control function g returns a larger value, whereby the color transition is enhanced.

Referring back to FIG. 1, in order to generate a correction signal R, the input signal F is also supplied to a "distance to local minimum" unit 26 and to a "distance to local maximum" unit 28. The "distance to local minimum" unit 26 first computes the local minimum $F_{min}$ by searching the interval of radius r centered at the current signal sample position. The radius r can be set to e.g. either to 3 or 4. After finding the local minimum, the "distance to local minimum" unit 26 then computes the distance between the input signal F and the local minimum $F_{min}$. Wherein, the output of the "distance to local minimum" unit 26 is the difference $F_{min}-F$.

Similarly, the "distance to local maximum" unit 28 first computes the local maximum $F_{max}$ by searching the interval of radius r centered at the current signal sample position, and then computes the distance between the input signal F and the local maximum $F_{max}$. Wherein, the output of the "distance to local maximum" unit 28 is the difference $F_{max}$–F.

Both the output of the "distance to local minimum" unit 26, $F_{min}$–F, and the output of the "distance to local maximum" unit 28, $F_{max}$–F, are supplied to the "logic control" unit 24. As described, the "logic control" unit 24 also uses the output of the "sign of second derivative" unit 20, which is the sign of the second derivative, sign(F"). Based on the sign of the second derivative, the "logic control" unit 24 selects either $F_{min}$–F, or $F_{max}$–F, or 0 as its output. As such:

If sign(F")=1, then output of the unit 24 is $F_{min}$–F;

If sign(F")=–1, then output of the unit 24 is $F_{max}$–F;

If sign(F")=0, then output of the unit 24 is 0.

The output of the "logic control" 24 unit is the correction signal R, which is then combined with the gain control function g at the node 30 (e.g., multiplier node). As such, the output of the node 30 is the adaptive correction signal AR based on the gain control function g, wherein the signal AR is combined with (e.g., added to) the original input signal F at the node 32 (e.g., summing node) to yield the enhanced signal output G.

The final output G of the system 10 can be expressed by example, as follows:

$$G = F + g(|F"|)*(F_{min}-F) \text{ if } F">0;$$

$$G = F + g(|F"|)*(F_{max}-F) \text{ if } F"<0;$$

$$G = F \text{ if } F"=0;$$

wherein g(|F"|) is the gain control function, which is a function of the absolute value of the second derivative F" as mentioned above.

Because $0 \leq g(|F"|) \leq 1$, then G can be represented as:

$$G = F - g(|F"|)*(F-F_{min}) \geq F - 1*(F-F_{min}) = F_{min} \text{ if } F">0;$$

and $$G = F + g(|F"|)*(F_{max}-F) \leq F + 1*(F_{max}-F) = F_{max} \text{ if } F"<0.$$

This indicates that the input signal essentially will never be "pushed" below its local minimum or over its local maximum, whereby there is no undershoot no overshoot in the enhanced signal.

Figure 3:
FIG. 3 shows an effect of color transition enhancement according to the present invention.

FIG. 3 shows an example curve representing effect of color transition enhancement according to the present invention. The solid curve 34 represents the transition curve of the input chrominance signal F. Geometric properties of the second derivative F" dictates that the curve 34 is "concave up" wherever F">0 and that the curve 34 is "concave down" wherever F"<0 .

Therefore, according to the above relations: (i) at the point where the curve 34 is "concave up" (F">0), the curve will be "pushed down" towards its local minimum by subtracting g(|F"|)*(F–$F_{min}$); and, (ii) at the point where the curve 34 is "concave down" (F"<0), the curve 34 will be "pushed up" towards its local maximum by adding g(|F"|)*($F_{max}$–F). The resulting curve 36 (indicated by the dotted line) is an enhanced chrominance signal with steep transitions, which does not exhibit undershoot or overshoot, according to the present invention. A such, the need for post-processing for overshoot/undershoot removal, is eliminated.

Figure 4:
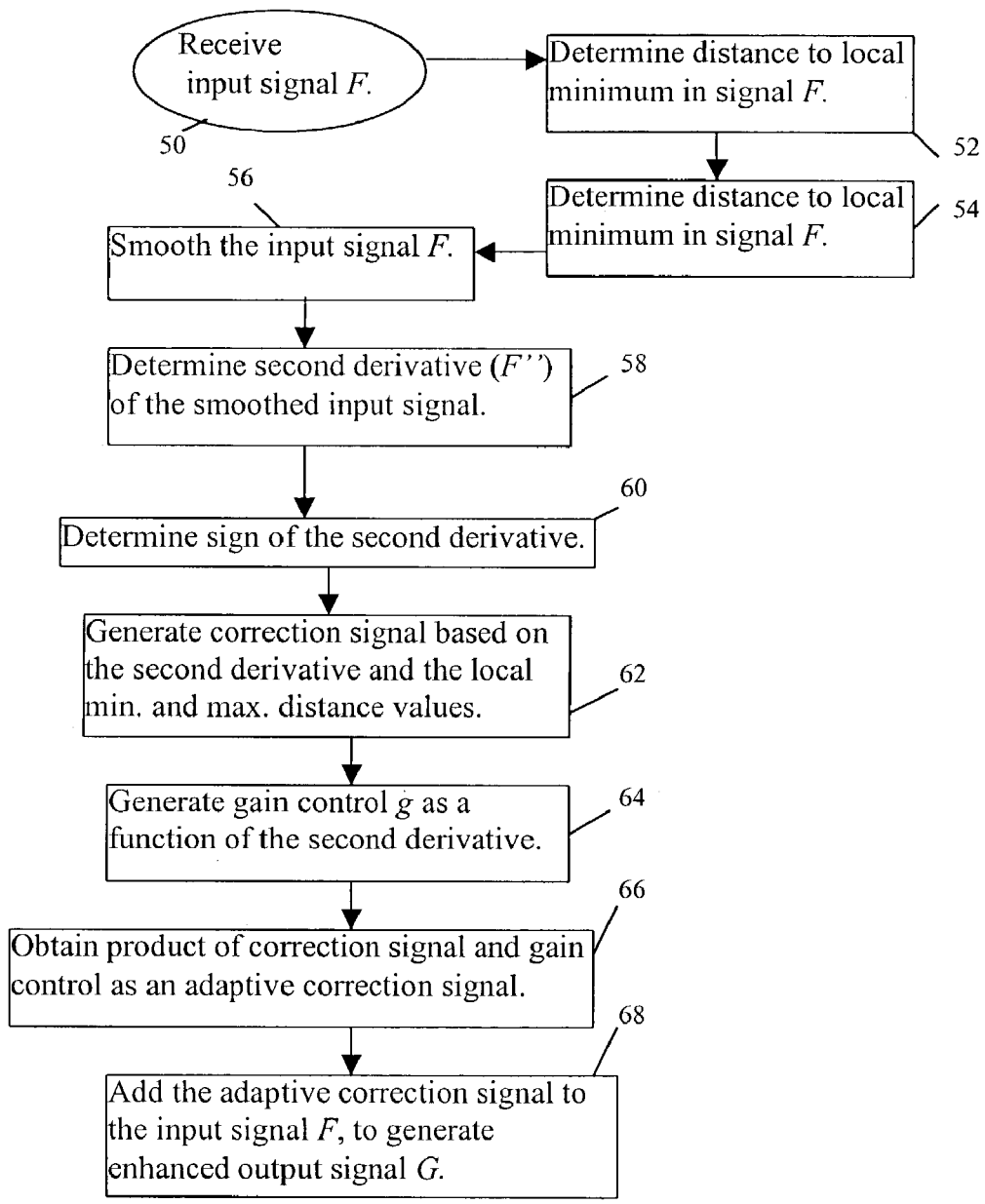
FIG. 4 shows an example flowchart of an embodiment of the steps of Transient Improvement technique according to the present invention.

FIG. 4 shows an example flowchart of the steps of CTI according to an embodiment of the present invention. After receiving the input signal F (step 50), the distance to local minimum and the distance to local maximum for the signal F are determined (steps 52, 54, respectively). The signal F is also smoothed in a low pass filter to obtain smoothed signal (step 56).

A second derivative F" of the smoothed signal is calculated (step 58), and the sign of the second derivative, sign(F"), is determined (step 60). Then, a correction signal is generated as a function of the second derivative and the local min. and max. distance values, wherein the correction signal controls transitions in the input signal (step 62). Further a gain control g is determined as a function of second derivative (step 64). The gain control and the correction signal are combined (e.g., multiplied) to obtain an adaptive correction signal (step 66), which is added to the input signal F, to generate the enhanced output signal G. Example details of a version of steps 50-68 were described in relation to FIG. 1 above.

The present invention further prevents noise accentuation. In the noisy image areas where there is no significant color transition, the second derivatives of the smoothed chrominance signals are very close to zero. Therefore, the gain control function, which is a function of the second derivative, is very close to zero in such areas. As such, the signals are barely changed in these areas, wherein the existing noise is not accentuated.

As such, the present invention provides a method of enhancing color transient of video signals. The method uses local image properties for adaptive gain control functions to control the gain of the color transient enhancement. In one example, the gain control function is represented by g(|F"|)= |F"|/(C+|F"|). A logic block is used to compute the smooth second derivative of the input signal by using a Gaussian filter combined with a five tap band pass filter. The distance to local min/max is used as the correction signal for color transient improvement to avoid undershoot and overshoot. Further, the correction signal is selected based on the value (e.g., sign) of the smooth second derivative.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of processing an image chrominance signal F having a transient response, comprising the steps of:

adaptively enhancing chrominance transient of the signal F as a function of corresponding image characteristics, to obtain an adaptively enhanced signal G, by: generating an adaptive correction signal AR for enhancing chrominance transient of the chrominance signal F, wherein the adaptive correction signal AR is a function of said corresponding image characteristics, wherein the step of generating the adaptive correction signal AR further includes the steps of generating a correction signal R for enhancing chrominance transient of the chrominance signal F, and adaptively controlling the correction signal R as a function of said corresponding image characteristics to generate said adaptive correction signal AR; wherein the step of generating the correction signal R further includes the steps of: determining a local chrominance signal minimum $F_{min}$; obtaining a difference between said chrominance signal F and said local minimum $F_{min}$; and generating the correction signal R based on said difference; and combining the adaptive correction signal AR with the chrominance signal F to obtain said enhanced signal G;

wherein the chrominance transient enhancement is controlled as a function of said corresponding image characteristics.

2. The method of claim 1, wherein the step of obtaining said local minimum $F_{min}$ further includes the steps of:

finding a minimum signal value in an interval of a radius r centered at the current chrominance signal sample position.

3. A method of processing an image chrominance signal F having a transient response, comprising the steps of adaptively enhancing chrominance transient of the signal F as a function of corresponding image characteristics, to obtain an adaptively enhanced signal G, by: generating an adaptive correction signal AR for enhancing chrominance transient of the chrominance signal F, wherein the adaptive correction signal AR is a function of said corresponding image characteristics, wherein the step of generating the adaptive correction signal AR further includes the steps of generating a correction signal R for enhancing chrominance transient of the chrominance signal F, and adaptively controlling the correction signal R as a function of said corresponding image characteristics to generate said adaptive correction signal AR; wherein the step of generating the correction signal R further includes the steps of: determining a local chrominance signal maximum $F_{max}$; obtaining a difference between said chrominance signal F and said local maximum $F_{max}$; and generating the correction signal R based on said difference; and combining the adaptive correction signal AR with the chrominance signal F to obtain said enhanced signal G;

wherein the chrominance transient enhancement is controlled as a function of said corresponding image characteristics.

4. The method of claim 3, wherein the step of obtaining said local maximum $F_{max}$ further includes the steps of:

finding a maximum signal value in an interval of a radius r centered at the current chrominance signal sample position.

5. A method of processing an image chrominance signal F having a transient response, comprising the steps of:

adaptively enhancing chrominance transient of the signal F as a function of corresponding image characteristics, to obtain an adaptively enhanced signal G, by: generating an adaptive correction signal AR for enhancing chrominance transient of the chrominance signal F, wherein the adaptive correction signal AR is a function of said corresponding image characteristics, wherein the step of generating the adaptive correction signal AR further includes the steps of generating a correction signal R for enhancing chrominance transient of the chrominance signal F, and adaptively controlling the correction signal R as a function of said corresponding image characteristics to generate said adaptive correction signal AR; wherein the step of generating the correction signal R further includes the steps of: determining a local chrominance signal minimum $F_{min}$; obtaining a first difference between said chrominance signal F and said local minimum $F_{min}$; determining a local chrominance signal maximum $F_{max}$; obtaining a second difference between said chrominance signal F and said local maximum $F_{max}$; generating the correction signal R based on said first or second difference; and combining the adaptive correction signal AR with the chrominance signal F to obtain said enhanced signal G;

wherein the chrominance transient enhancement is controlled as a function of said corresponding image characteristics.

6. The method of claim 5, wherein the step of generating the correction signal R based on said first or second difference further includes the steps of:

generating a property signal representing geometric properties of the signal F;

using the property signal to select between one of said first or second difference;

generating the correction signal R as a function of the selected difference.

7. The method of claim 5, wherein the step of generating the correction signal R based on said first or second difference further includes the steps of:

generating a second derivative of the signal F;

selecting one of said first or second difference based on said second derivative; and generating the correction signal R as a function of the selected difference.

8. A method of processing an image chrominance signal F having a transient response, comprising the steps of:

adaptively enhancing chrominance transient of the signal F as a function of corresponding image characteristics, to obtain an adaptively enhanced signal G, by: generating an adaptive correction signal AR for enhancing chrominance transient of the chrominance signal F, wherein the adaptive correction signal AR is a function of said corresponding image characteristics, wherein the step of generating the adaptive correction signal AR further includes the steps of generating a correction signal R for enhancing chrominance transient of the chrominance signal F, and adaptively controlling the correction signal R as a function of said corresponding image characteristics to generate said adaptive correction signal AR; wherein the step of adaptively controlling the correction signal R as a function of said corresponding image characteristics to generate said adaptive correction signal AR, further includes the steps of generating a gain control g based on the local image characteristics; and controlling the correction signal R in response to the gain control g; and combining the adaptive correction signal AR with the chrominance signal F to obtain said enhanced signal G;

wherein the chrominance transient enhancement is controlled as a function of said corresponding image characteristics.

9. The method of claim 8, wherein the step of generating the gain control g further includes the steps of:

generating a property signal representing geometric properties of the signal F; and generating the gain control g based on the property signal.

10. The method of claim 9, wherein the steps of generating said property signal further includes the steps of:

determining a second derivative F" of the signal F such that the property signal is a function of the second derivative F".

11. The method of claim 10, wherein the step of generating the gain control g further includes the steps of:

determining an absolute value |F"| of the second derivative F"; and generating the gain control g based on said value |F"|, wherein: (i) the gain control g is a continuous increasing function ranging between 0 and 1, and (ii) the gain control g is close to 0 for small values of |F"|, and is close to 1 for larger values of |F"|.

12. The method of claim 11, wherein the gain control function g is represented by the relation:

$$g = \frac{|F''|}{C+|F''|}$$

wherein C is a constant greater than 0.

13. The method of claim 10, further comprising the steps of:
smoothing the signal F using a Gaussian filter combined with a band-pass filter, and then obtaining said second derivative F" of the smoothed signal.

14. A chrominance signal processor, comprising:
an adaptive enhancer that receives an image chrominance signal F having a transient response, and adaptively enhances chrominance transient of the signal F as a function of corresponding image characteristics, to generate an adaptively enhanced signal G; wherein the adaptive enhancer further comprises an adaptive correction signal generator that generates an adaptive correction signal AR for enhancing chrominance transient of the chrominance signal F, wherein the adaptive correction signal AR is a function of said corresponding image characteristics; and a combiner that combines the adaptive correction signal AR with the chrominance signal F to obtain said enhanced signal G; wherein the adaptive correction signal generator further comprises a correction signal generator that generates a correction signal R for enhancing chrominance transient of the chrominance signal F; and an adaptive controller that adaptively controls the correction signal R as a function of said corresponding image characteristics to generate said adaptive correction signal AR; wherein the correction signal generator further comprises: difference logic that determines a local chrominance signal minimum $F_{min}$, and obtains a difference between said chrominance signal F and said local minimum $F_{min}$; and control logic that generates the correction signal R based on said difference; and
wherein the chrominance transient enhancement is controlled as a function of said corresponding image characteristics.

15. The signal processor of claim 14, wherein the difference logic is configured to find a minimum signal value in an interval of a radius r centered at the current chrominance signal sample position.

16. A chrominance signal processor, comprising:
an adaptive enhancer that receives an image chrominance signal F having a transient response, and adaptively enhances chrominance transient of the signal F as a function of corresponding image characteristics, to generate an adaptively enhanced signal G; wherein the adaptive enhancer further comprises an adaptive correction signal generator that generates an adaptive correction signal AR for enhancing chrominance transient of the chrominance signal F, wherein the adaptive correction signal AR is a function of said corresponding image characteristics; and a combiner that combines the adaptive correction signal AR with the chrominance signal F to obtain said enhanced signal G; wherein the adaptive correction signal generator further comprises a correction signal generator that generates a correction signal R for enhancing chrominance transient of the chrominance signal F; and an adaptive controller that adaptively controls the correction signal R as a function of said corresponding image characteristics to generate said adaptive correction signal AR; wherein the correction signal generator further comprises difference logic that determines a local chrominance signal maximum $F_{max}$, and obtains a difference between said chrominance signal F and said local maximum $F_{max}$; and control logic that generates the correction signal R based on said difference; and
wherein the chrominance transient enhancement is controlled as a function of said corresponding image characteristics.

17. The signal processor of claim 16, wherein the difference logic is configured to find a maximum signal value in an interval of a radius r centered at the current chrominance signal sample position.

18. A chrominance signal processor, comprising
an adaptive enhancer that receives an image chrominance signal F having a transient response, and adaptively enhances chrominance transient of the signal F as a function of corresponding image characteristics, to generate an adaptively enhanced signal G; wherein the adaptive enhancer further comprises an adaptive correction signal generator that generates an adaptive correction signal AR for enhancing chrominance transient of the chrominance signal F, wherein the adaptive correction signal AR is a function of said corresponding image characteristics; and a combiner that combines the adaptive correction signal AR with the chrominance signal F to obtain said enhanced signal G; wherein the adaptive correction signal generator further comprises a correction signal generator that generates a correction signal R for enhancing chrominance transient of the chrominance signal F; and an adaptive controller that adaptively controls the correction signal R as a function of said corresponding image characteristics to generate said adaptive correction signal AR; wherein the correction signal generator further comprises a first difference logic that determines a local chrominance signal minimum $F_{min}$, and obtains a difference between said chrominance signal F and said local minimum $F_{min}$; a second difference logic that determines a local chrominance signal maximum $F_{max}$, and obtains a difference between said chrominance signal F and said local maximum $F_{max}$; and control logic that generates the correction signal R based on said first or second difference; and
wherein the chrominance transient enhancement is controlled as a function of said corresponding image characteristics.

19. The signal processor of claim 18, further comprising:
a signal property generator that generates a signal representing geometric properties of the signal F;
wherein the control logic uses the property signal to select between one of said first or second difference, and generates the correction signal R as a function of the selected difference.

20. The signal processor of claim 18, further comprising:
a differentiator that generates a second derivative of the signal F;
wherein the control logic uses the second derivative to select between one of said first or second difference, and generates the correction signal R as a function of the selected difference.

21. A chrominance signal processor, comprising:

an adaptive enhancer that receives an image chrominance signal F having a transient response, and adaptively enhances chrominance transient of the signal F as a function of corresponding image characteristics, to generate an adaptively enhanced signal G; wherein the adaptive enhancer further comprises an adaptive correction signal generator that generates an adaptive correction signal AR for enhancing chrominance transient of the chrominance signal F, wherein the adaptive correction signal AR is a function of said corresponding image characteristics; and a combiner that combines the adaptive correction signal AR with the chrominance signal F to obtain said enhanced signal G; wherein the adaptive correction signal generator further comprises a correction signal generator that generates a correction signal R for enhancing chrominance transient of the chrominance signal F; and an adaptive controller that adaptively controls the correction signal R as a function of said corresponding image characteristics to generate said adaptive correction signal AR; wherein the adaptive controller further comprises a gain controller that generates a gain control g based on the local image characteristics, and controls the correction signal R in response to the gain control g to generate said adaptive correction signal AR; and wherein the chrominance transient enhancement is controlled as a function of said corresponding image characteristics.

22. The signal processor of claim 21, further comprising:
a signal property generator that generates a signal representing geometric properties of the signal F;
wherein the gain controller generated the gain control g based on the property signal.

23. The signal processor of claim 22, wherein the signal property generator comprises a differentiator that determines a second derivative F" of the signal F wherein the property signal is a function of the second derivative F".

24. The signal processor of claim 23, wherein the gain controller is configured to determine an absolute value |F"| of the second derivative F"; and generate the gain control g based on said value |F"|, wherein: (i) the gain control g is a continuous increasing function ranging between 0 and 1, and (ii) the gain control g is close to 0 for small values of |F"|, and is close to 1 for larger values of |F"|.

25. The signal processor of claim 24, wherein the gain control function g is represented by the relation:

$$g = \frac{|F''|}{C + |F''|}$$

wherein C is a constant greater than 0.

26. The signal processor of claim 23, further comprising:
a smoothing filter that smoothes the signal F, the smoothing filter including a Gaussian filter combined with a band-pass filter, wherein said differentiator generates the second derivative F" based on the smoothed signal.

* * * * *